United States Patent

Cameron et al.

[11] Patent Number: 4,764,313
[45] Date of Patent: Aug. 16, 1988

[54] AIR DRIVEN WATER CIRCULATION MILL

[75] Inventors: Douglas Cameron; Lorraine Cameron, both of Assiniboia, Canada

[73] Assignee: Sunset Solar Systems Ltd., Assiniboia, Canada

[21] Appl. No.: 926,324

[22] Filed: Nov. 3, 1986

[51] Int. Cl.[4] .............................................. B01F 3/04
[52] U.S. Cl. .................................. 261/35; 210/242.2; 261/91; 261/120; 290/44; 290/55; 415/7; 416/85; 416/171; 417/61; 417/334; 441/67
[58] Field of Search ................... 261/35, 36.1, 91, 120, 261/DIG. 47; 210/242.2, 219; 441/67; 417/61, 334; 415/7; 416/171, 85, 86; 290/44, 55

[56] References Cited

U.S. PATENT DOCUMENTS

| | | | |
|---|---|---|---|
| 3,373,821 | 3/1968 | Sare | 261/91 X |
| 3,515,375 | 6/1970 | Roos | 210/242.2 X |
| 3,603,699 | 9/1971 | Brashear et al. | 416/171 |
| 3,620,512 | 11/1971 | Muskat et al. | 210/242.2 X |
| 3,653,641 | 4/1972 | Eron | 210/242.2 X |
| 3,785,558 | 1/1974 | Albritton et al. | 210/242.2 X |
| 3,802,673 | 4/1974 | Ross | 210/242.2 X |
| 4,030,859 | 6/1977 | Henegar | 261/120 X |
| 4,179,243 | 12/1979 | Aide | 261/91 X |
| 4,216,091 | 8/1980 | Mineau | 261/120 X |
| 4,308,137 | 12/1981 | Freeman | 261/120 X |

Primary Examiner—Richard L. Chiesa
Attorney, Agent, or Firm—Stanley G. Ade; Murray E. Thrift; Adrian D. Battison

[57] ABSTRACT

A flotation platform supports a mast assembly through which a drive shaft extends having a wind driven turbine on the upper end and a propeller on the lower end situated below the water surface. The propeller is rotated by the wind turbine and causes localized water circulation in the body of water in which the mill is situated thus aerating and mixing the water in the summer and also maintaining an ice free area around the mill in winter.

13 Claims, 2 Drawing Sheets

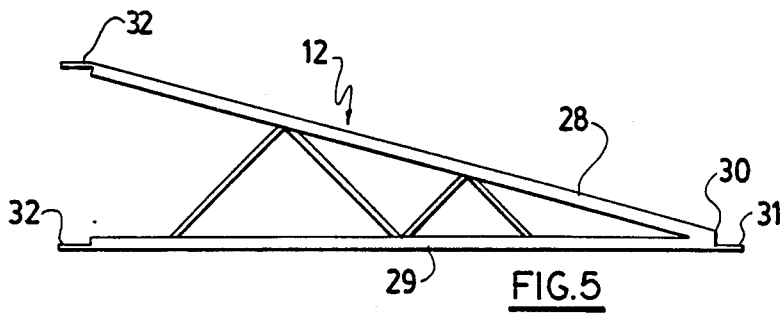
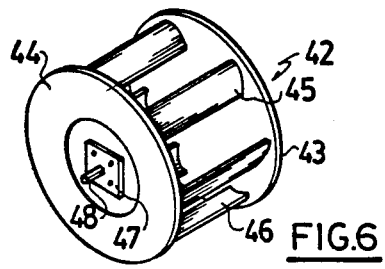
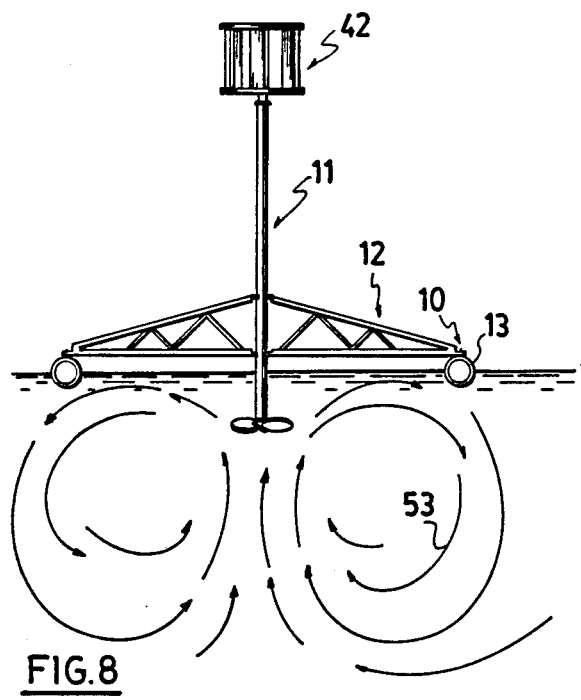
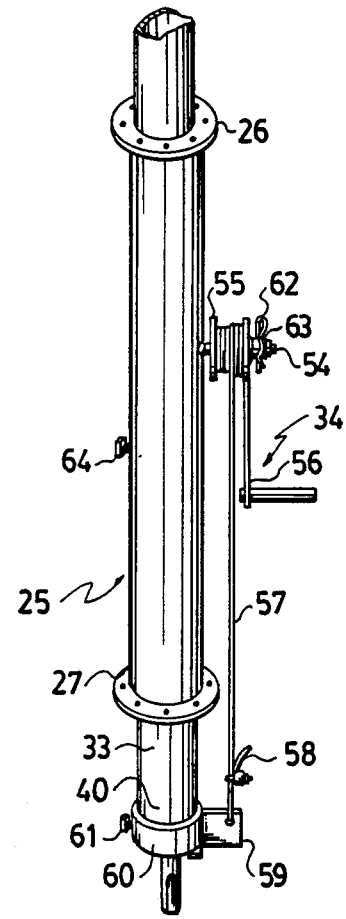

AIR DRIVEN WATER CIRCULATION MILL

BACKGROUND OF THE INVENTION

This invention relates to new and useful improvements in air operated mills, particularly mills designed for installation upon bodies of water such as ponds, dugouts, dams, lakes and the like.

Such bodies of water, particularly relatively small bodies of water such as dugouts and ponds, often suffer from lack of oxygen and circulation particularly during hot summer weather.

There is a need to aerate such bodies of water particularly when same are used for fish farming or as a water supply for cattle or farm homes and the like.

In the hot weather, algae growth is a problem and if it is extremely hot it is often necessary to spray the body of water with copper sulfate once a month although excessive use of such chemicals will completely kill all plant life and also use up all of the oxygen present within the water thus killing all other life and creating dead murky water.

In contrast, ice cover in the winter causes plant life to decay without oxygen (aerobic decomposition) thus creating ammonia, methane, carbon dioxide and hydrogen sulfide gases to give murky tainted odorous "black water".

The present device overcomes difficulties present both in summer and winter, in such bodies of water by circulating the water locally by drawing deep water upwardly and then spreading it outwardly from the device. This helps prevent stagnation by the circulation of the deeper water to the surface and this deeper water, being warmer than the surface water, also assists in melting the ice cover.

It has been found that open water will remain clear of ice cover depending on the wind and air temperature, from a diameter of fourteen feet to sixty feet and it has been found that the use of the present device will upgrade most pond water to drinking water quality.

This is accomplished by the provision of a flotation platform supporting an air operated drive shaft having a propeller on the lower end thereof below the water surface, the direction of the blades drawing the water inwardly and upwardly and circulating it outwardly from the propeller. Although several means can be used to rotate the drive shaft, the preferred method is by means of a wind turbine secured to the upper end of the drive shaft so that the device operates with the minimum of air movement across the surface of the body of water.

In accordance with the invention therefore, there is provided an air driven water mill for bodies of water such as dugouts, ponds, dams, lakes and the like; comprising in combination a flotation platform, a mast assembly supported by said flotation platform and extending upwardly therefrom, means to support said mast upon said flotation platform, a drive shaft journal for rotation within said mast assembly, air driven means secured to the upper end of said shaft and a propeller secured to the lower end of said shaft and situated below the water surface when installed upon the associated body of water.

Another advantage of the invention is to enable fish to be wintered successfully and to eliminate what is known as "slough water" taste both in summer and winter by aeration of the water body by means of the present device. The device also assists in cooling the water in the summer by circulating the cooler, deeper water to the surface thus helping to prevent the growth of algae and encourage shrimp and other food sources to live and multiply.

A further advantage of the invention is to provide a device which is easily transported in a knocked down condition and can readily be assembled on site when required.

A further advantage of the invention is to provide a device which assists in maintaining the quality of water particularly in relatively small ponds or dugouts and which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

BRIEF DESCRIPTION OF THE DRAWINGS

FIG. 5 is a side elevation of one of the leg brace assemblies.

FIG. 6 is an isometric view of the turbine.

FIG. 7 is a front elevation of the center section and mast assembly.

FIG. 8 is a schematic view showing the desired circulation caused by the device.

In the drawings like characters of reference indicate corresponding parts in the different figures.

DETAILED DESCRIPTION OF THE DRAWINGS

Figure 1:
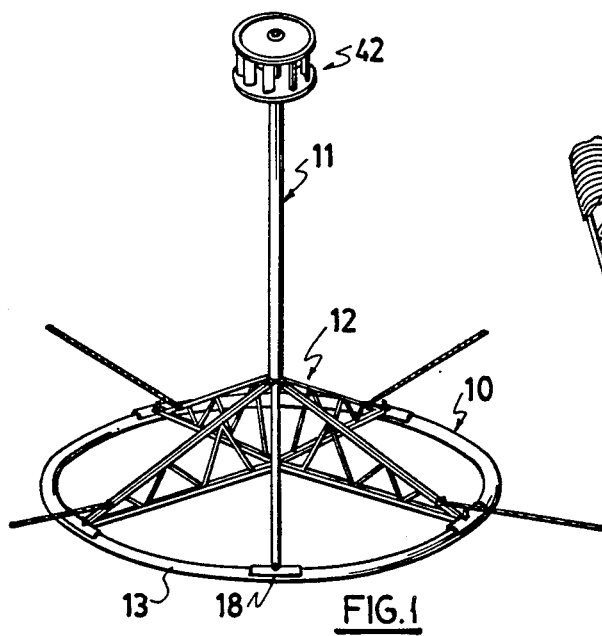
FIG. 1 is a front elevation of the device in the assembled position.

Proceeding therefore to describe the invention in detail, reference should be made to FIG. 1 in which 10 illustrates generally the flotation platform having a mast assembly collectively designated 11 extending upwardly therefrom and supported by means of leg brace assemblies collectively designated 12.

Figure 2:
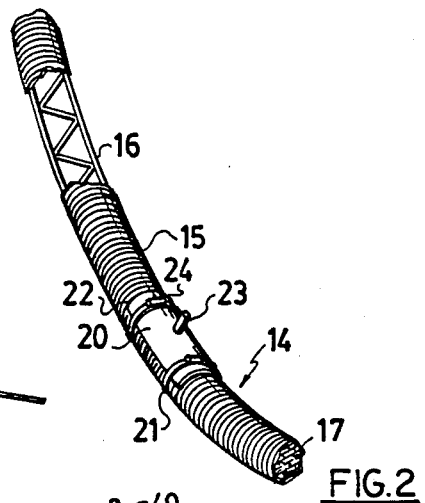
FIG. 2 is an isometric fragmentary view of one segment of the flotation ring.

In detail, the flotation platform is preferably in the form of a flotation ring 13 made up of a plurality of segments collectively designated 14 and shown in detail in FIG. 2.

Each segment takes the form of a water impervious tubular cover 15 having steel or aluminum rod reinforcement 16 extending therethrough and being filled with flotation material such as foam 17.

These segments are arcuately formed due to the configuration of the bracing steel rod assembly 16 and are detachably secured together by means of a saddle plate assembly 18 situated between the junction of adjacent segment ends 19.

The saddle plates each consist of a semicircular steel or other material plate 20 adapted to fit snugly over the two adjacent ends of the segments 14 and being secured thereto by means of ring clamps 21, one extending over adjacent each end 22 of the saddle plates and around the relevant ends 19 of the two segments. These clamps, when tightened, clamp the two segments firmly to the saddle plate in end to end relationship. A screw threaded bolt or stud 23 extends upwardly from the crown 24 of the saddle plate intermediate the ends 22 thereof, the purpose of which will hereinafter be described.

In the present embodiment, three segments 14 make up the completed ring thus requiring three saddle plates 20 and three further saddle plates, similar in configuration and operation to saddle plates 20 are secured and located on the segments intermediate the ends thereof making a total of six such saddle plates.

The six saddle plates, each having a bolt or stud 23 extending upwardly therefrom act as detachable securement points for the brace leg assemblies 12 as will hereinafter be described.

The central mast assembly consists of a center section collectively designated 25 comprising a vertically situated tube having apertured flanges 26 and 27 secured to the upper and lower ends thereof respectively and this center section is supported centrally of the ring and vertically and perpendicular to the plane thereof by means of the aforementioned leg assemblies, one of which is shown in detail in FIG. 5.

Each leg assembly includes an upper member 28 and a lower member 29 terminating at a common junction 30 at the outer end thereof and having an apertured flange 31 at this junction.

The lower member 29 is substantially horizontal whereas the upper member diverges upwardly and inwardly from the lower member but in the same vertical plane. Each of the members 28 and 29 terminate in an apertured lug 32 on the outer ends thereof.

These leg assemblies are secured by the lug 31 over the bolt or stud 23 upon each of the saddle plates and are maintained in position by a nut engaging the stud or bolt.

The inner ends of the lower members 29 of the leg assemblies are secured as by nuts and bolts (not illustrated) around the periphery of the apertured flange 27 at the lower end of the center section 25 and the inner ends of the upper leg members 28 are similarly secured around the perimeter of the upper flange 26 of the center section is being understood that the members 28 and 29 of the individual assemblies 12 are vertically situated when installed.

This supports the center section firmly in a vertical position centrally of the ring 10 and a hollow or tubular mast 33 slideably extends through this center section and can be moved vertically as desired by means of a winch assembly collectively designated 34 and operatively extending between the center section and the lower end of the mast 33 as will hereinafter be described.

A drive shaft 35 is journalled for rotation in upper and lower bearings 36 and 37 respectively and which are situated at the upper and lower ends of the hollow mast and secured thereto in a conventional manner.

The upper bearing assembly 36 is conventional and includes an inner race and an outer race (not illustrated).

Figure 3:
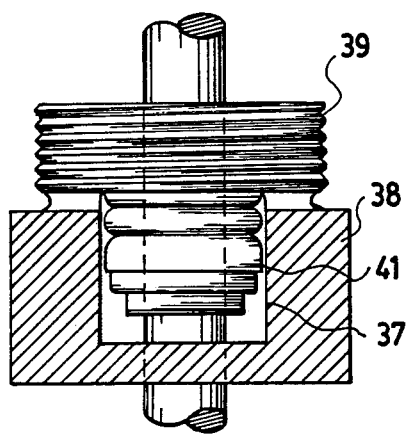
FIG. 3 is a fragmentary cross-sectional view of the lower bearing assembly for the drive shaft.
Figure 4:
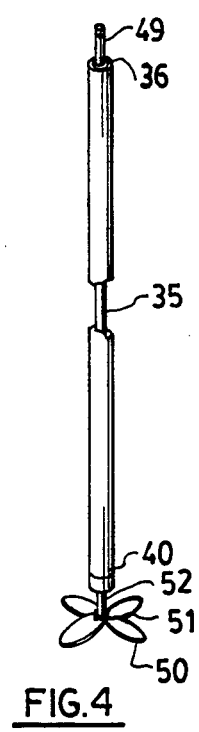
FIG. 4 is a front elevation of the mast per se, sectioned in part to show the interior thereof.

The lower bearing assembly is shown in FIG. 3 and consists of a retainer unit 38 having a screw threaded upper end 39 screw threadably engaging within the lower end 40 of the mast 33. It includes a spring loaded bearing and seal assembly 41 similar to those used in water pumps and the like in order to prevent the ingress of water as this portion is usually situated under water.

The shaft 35 is rotated by air driven means such as turbine collectively designated 42 and shown in detail in FIG. 6. It consists of an upper disc 43 and a lower disc 44 with curved turbine blades or fins 45 extending therebetween braced by transverse rods 46. A plate 47 is secured centrally of the lower disc 44 and is provided with a bushing 48 engagable over the upper end stub shaft portion 49 of the drive shaft and is secured thereto by means of a set screw or the like (not illustrated).

A propeller 50, preferably four bladed, is provided with a bushing and set screw 51 and is engagable over the lower stub shaft end 52 of the drive shaft with the blades being directed so that upon rotation by the turbine 42, water is drawn upwardly from below the blade and expelled outwardly as clearly shown by the movement arrows 53 in FIG. 8.

The aforementioned winch assembly 34 includes a fixed winch pin 54 secured by one end to the center section and extending outwardly therefrom. A winch drum 55 is freely engaged thereover rotatable by means of a handle 56 extending therefrom. A cable 57 extends around the drum downwardly and then downwardly to be anchoraged by the distal end 58 thereof to an offstanding plate 59 secured to a winch cup 60 engagable over the lower end of the mast 33 and secured in position by means of set screw 61.

Rotation of the handle 56 will therefore move the mast upwardly or downwardly within the center section 25 and once the desired relationship is reached, a winch pin 62 engages through the sleeve 63 of the winch drum and the fixed winch axle 54 thus preventing further rotation of the winch. In addition, a pair of set screws or clamp bolts 64 screws threadably engaged through the wall of the center section 25 and engage the surface of the mast 33 thus preventing relative movement between the mast and the center section 25.

In operation, the mill is assembled and floated on the surface of the water or moved out upon the surface of the ice. If on the surface of the ice, an aperture is augered through the ice sufficiently large so that the propeller 50 will pass therethrough. Under either circumstance, the winch is operated to lower the mast relative to the center section and flotation ring until the propeller is approximately two feet below the surface of the water whereupon the mast is clamped to the center section as hereinbefore described.

Any air movement will rotate the turbine and thus rotating the propeller thereby causing water circulation in the direction of arrows 53 shown schematically in FIG. 8.

The ice will melt around the propeller until the flotation ring is floating upon the surface of the cleared water and this cleared area will be maintained under normal circumstances.

Tether ropes (not illustrated) extend from the junctions 30 of convenient leg assemblies, to anchor points upon the shore.

If the shore is too distant, then these tether ropes may be substituted with anchor ropes having weights thereon with the ropes being sufficiently deep so that the weights will reach the bottom of the body of water.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. An air driven water mill for bodies of water such as dugouts, ponds, dams, lakes and the like; comprising in combination a flotation platform, including a flotation ring comprising a segmented tube, and means to detachably secure said segments together to form the ring, each said segment including an outer cover, internal bracing within said cover and flotation material within said cover, a mast assembly including a vertically situated tubular center section, a tubular mast slidable within said center section, and means for selectively moving said mast vertically within said center section, means to support said mast assembly center section upon said flotation platform, a drive shaft journalled for rotation within said tubular mast, air driven means secured to the upper end of said shaft and a propeller secured to the lower end of said shaft and situated below the water surface when installed upon the associated body of water.

2. The mill according to claim 1 in which said means to detachably secure said segments together includes a saddle plate spanning each junction between adjacent segments and clamps extending around said plate and around the adjacent ends of said segments.

3. The mill according to claim 2 in which said air driven means comprises a turbine secured to the upper end of said drive shaft, said turbine including a pair of spaced and parallel end plates and a plurality of turbine blades extending therebetween, said turbine being situated vertically with said end plates being horizontal when installed.

4. The mill according to claim 2 in which said means to selectively move said mast vertically within said center section comprises a hand operated winch mounted on said center section, and a cable wound on the winch, said cable operatively extending between said winch and the lower end of said mast, means to detachably lock said winch in any desired position and means to detachably clamp said mast within said center section when positioned.

5. The mill according to claim 2 in which said means to support said mast assembly center section upon said flotation platform includes a plurality of leg brace assemblies extending radially between said ring and said center section, each said leg brace assembly including an upper member and a lower member joined at one end and detachably secured to said ring and diverging inwardly towards said mast assembly whereby said upper member is detachably secured to said center section vertically above the detachable securement of said lower member to said center section.

6. The mill according to claim 5 in which said mast assembly includes a vertically situated tubular center section supported by said flotation platform and a tubular mast selectively slideable within said center section, and means to selectively move said mast vertically within said center section, said drive shaft being joined for rotation within said tubular mast.

7. The mill according to claim 5 in which said means to selectively move said mast vertically within said center section comprises a hand oeprated winch mounted on the center section, and a cable wound on the winch, said cable operatively extending between said winch and the lower end of said mast, means to detachably lock said winch in any desired position and means to detachably clamp said mast within said center section when positioned.

8. The mill according to claim 1 in which said means to support said mast assembly center section upon said flotation platform includes a plurality of leg brace assemblies extending radially between said ring and said center section, each said leg brace assembly including an upper member and a lower member joined at one end and detachably secured to said ring and diverging inwardly towards said mast assembly whereby said upper member is detachably secured to said center section vertically above the detachable securement of said lower member to said center section.

9. The mill according to claim 8 in which said air driven means comprises a turbine secured to the upper end of said drive shaft, said turbine including a pair of spaced and parallel end plates and a plurality of turbine blades extending therebetween, said turbine being situated vertically with said end plates being horizontal when installed.

10. The mill according to claim 8 in which said means to selectively move said mast vertically within said center section comprises a hand operated winch mounted on said center section, and a cable wound on said winch, said cable operatively extending between said winch and the lower end of said mast, means to detachably lock said winch in any desired position and means to detachably clamp said mast within said center section when positioned.

11. The mill according to claim 1 in which said air driven means comprises a turbine secured to the upper end of said drive shaft, said turbine including a pair of spaced and parallel end plates and a plurality of turbine blades extending therebetween, said turbine being situated vertically with said end plates being horizontal when installed.

12. The mill according to claim 1 in which said means to selectively move said mast vertically within said center section comprises a hand operated winch mounted on said center section, and a cable wound on the winch, said cable operatively extending between said winch and the lower end of said mast, means to detachably lock said winch in any desired position and means to detachably clamp said mast within said center section when positioned.

13. An air driven water mill for bodies of water such as dugouts, ponds, dams, lakes and the like; comprising in combination a flotation platform, a mast assembly including a vertically situated tubular center section, a tubular mast slidable within said center section, and means for selectively moving said mast vertically within said center section comprising a hand operated winch mounted on said center section, and a cable wound on the winch, said cable operatively extending between said winch and the lower end of said mast, means to detachably lock said winch in any desired position and means to detachably clamp said mast within said center section when positioned, means to support said mast assembly center section upon said flotation platform, a drive shaft journalled for rotation within said tubular mast, air driven means secured to the upper end of said shaft and a propeller secured to the lower end of said shaft and situated below the water surface when installed upon the associated body of water.

* * * * *